United States Patent [19]

Hollinger

[11] Patent Number: 5,515,055
[45] Date of Patent: May 7, 1996

[54] SYSTEM FOR PROCESSING RETURNS FROM A TARGET FROM TRANSMISSIONS CONTAINING REPEATED SIGNALS TO DETECT THE DOPPLER VELOCITY OF THE TARGET

[75] Inventor: David P. Hollinger, Avon, N.Y.

[73] Assignee: Hydroacoustics, Inc., Rochester, N.Y.

[21] Appl. No.: 415,820

[22] Filed: Apr. 3, 1995

[51] Int. Cl.$^6$ .................................................. G01S 13/53
[52] U.S. Cl. ............................................ 342/108; 367/100
[58] Field of Search ............................. 367/100; 342/108, 342/109, 189

[56] References Cited

U.S. PATENT DOCUMENTS 4,831,602  5/1989  Kroenert et al. ..................... 367/100
5,077,702  12/1991  Whyland ............................... 367/100
5,212,489  5/1993  Nelson .................................. 342/109
5,212,490  5/1993  Nelson et al. ........................ 367/100

*Primary Examiner*—Daniel T. Pihulic
*Attorney, Agent, or Firm*—M. LuKacher

[57] ABSTRACT

A signal processing system of reduced complexity over conventional banks of matched filters for each Doppler velocity of interest is responsive to a transmission which is in the form of a train of repeated Doppler invariant signals which are preferably phase continuous. The system utilizes a head end zero Doppler correlator and tapped delay line summer with summing nodes in cascade for each Doppler velocity of interest. The summer provides coherent sums indicative of the Doppler velocity of the target.

7 Claims, 3 Drawing Sheets

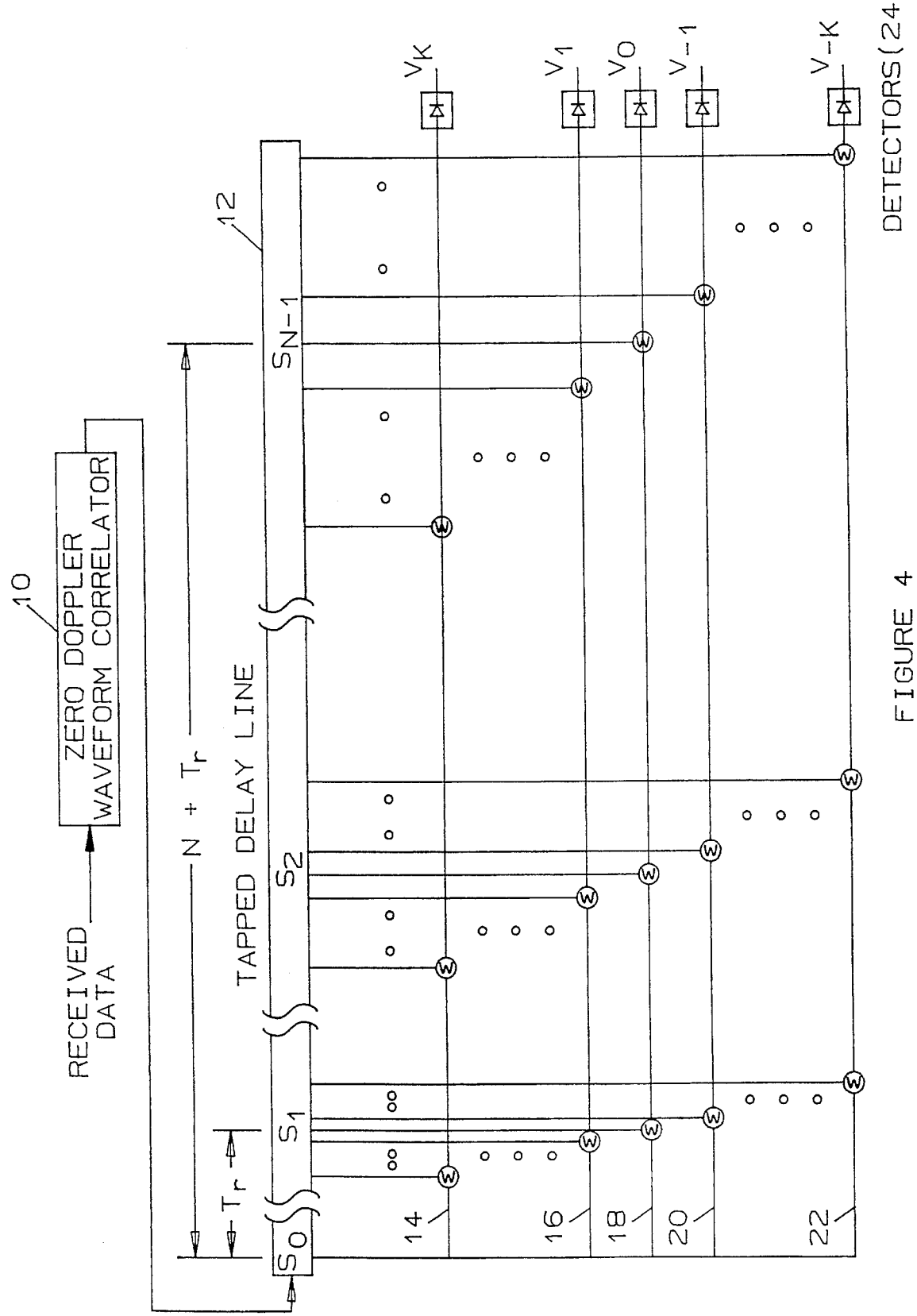

SYSTEM FOR PROCESSING RETURNS FROM A TARGET FROM TRANSMISSIONS CONTAINING REPEATED SIGNALS TO DETECT THE DOPPLER VELOCITY OF THE TARGET

DESCRIPTION

The present invention relates to a system (method and apparatus) for processing returns from a target on which transmissions of repeated Doppler invariant signals are incident to obtain the Doppler velocity of the target without the need for complex processing facilities such as a bank of correlators or matched filters for each Doppler velocity of interest.

It is a feature of the invention to process signals utilizing delay line and coherent summing techniques such as described in U.S. Pat. No. 5,212,489 issued to David E. Nelson on May 18, 1993. The system of this invention processes returns from transmissions, containing signals that are repeated N times to constitute each transmission thereby, obtaining efficiency and reduced complexity of processing attendant to such delay line and coherent summing processing and avoiding the complexity of a bank of matched filters to process such transmissions, with a separate matched filter for each Doppler velocity of interest.

The invention is useful in sonar and radar systems, which are also known as echo ranging systems, to optimally process a wavetrain containing waveform signals which are repeated a plurality of times (N times) with either uniform or non-uniform spacing in time. The processing system is adapted to be implemented in a computer in which data corresponding to the return signals from the transmission are progressively delayed to provide sets of signals which are coherently summed, each sum corresponding to a different Doppler velocity of the target from which the returns are detected by sonar or radar receiving circuitry.

A class of transmission which has been suggested for use in sonar systems, since it provides output relatively insensitive to reverberators (objects which are stationary and exhibit 0 Doppler velocity) is a wavetrain containing a waveform (an identical signal) repeated N times with uniform waveform spacing. This signal is usually phase continuous and does not have any step function in either amplitude or frequency. Each signal is desirably Doppler invariant and may be a hyperbolic FM (HFM) waveform which changes monotonically (sweeps) in frequency over a duration of $T_f$ seconds. Such signals are discussed in the above-referenced patent which was issued to David E. Nelson and assigned to Hydroacoustics Inc. (the Nelson patent). Such signals are Doppler invariant which is a characteristic of certain signals and is defined in the above referenced Nelson Patent. An individual Doppler invariant HFM sweep is shown in FIG. 1 and a wavetrain composed of repeated sweeps repeated N times and of a duration $T_r$ which is equal to $N*T_f$ is shown in FIG. 2. The *'s indicates multiplication.

When any signal is returned from a moving target, it is compressed or stretched in time proportionately to the relative target velocity between the source of the transmission and the receiver (the Doppler velocity). Processing of such a wavetrain, as shown in FIG. 2 conventionally utilizes a bank of Doppler wavetrain correlators or matched filters as shown in FIG. 3, which cover each discrete Doppler velocity of interest, from $V_k$ to $-V_k$. The correlators are equal in length to the wavetrain duration and separate correlators are needed for each Doppler velocity in order to process the return signal. Thus the processing system shown in FIG. 3 requires $(2*V_k)/\Delta V_r$ correlators, where $\Delta V_r$ is the velocity resolution. For wavetrains such as shown in FIG. 2, 20 to over 100 correlators or matched filters are needed. Extensive computational capacity (computer load or overhead) is needed to process such data in real time, as is required for Doppler velocity detection, in many sonar and radar applications.

The signal processing system provided by the invention requires only a single correlator at the head end of the system coupled to a tapped delay line with taps which provide sets of outputs to cascaded coherent summers which progressively sum the outputs in each set. A set is provided for each Doppler velocity of interest.

One tapped delay line and one head end zero Doppler correlator is required when the wavetrain is a transmission of repeated HFM sweeps such as shown in FIG. 2. In the event that "V" or rooftop signals are utilized, as shown in the Nelson patent, a pair of such correlators and delay lines and pairs of sets of summers are required for each segment of the transmission. The output of each summer is again summed to provide each of the outputs for each Doppler velocity ($+V_k$ to $-V_k$) of interest.

Accordingly, it is the principle object of the present invention to provide an improved signal processing system of less complexity than a bank of matched filters or correlators which obtains the Doppler velocity of returns from transmissions made up of repetitive, and preferably identical, Doppler invariant signals.

More generally, it is the object of the invention to provide a system for detecting the velocity of a target from returns from the target irradiated by transmissions containing a plurality of successive Doppler invariant signals. It will be appreciated that while the signals themselves are Doppler invariant, the wavetrain constituted of N repetitions of these Doppler invariants signals is not Doppler invariant.

It is a still further object of the present invention to provide an improved system for measurement of Doppler velocity by processing returns in response to transmissions of identical Doppler invariant waveforms.

It is a still further object of the present invention to provide an improved system for processing return signals due to transmissions which contain a plurality of successive Doppler invariant signals each constituted of an identical waveform.

Briefly described, a system for detecting the velocity of a target from signals returned from the target in response to a transmission containing a plurality of successively occurring, and preferably identical, Doppler invariant signals first correlates the returns with a replica of one of the Doppler invariant signals of the wavetrain transmission. Preferably this is a zero Doppler waveform correlator. The correlation process provides an output which is subject to delays in a plurality of different time relationships to provide a plurality of sets of outputs which occur in different time relationships. Each of these relationships corresponds to a different velocity of the target. A tapped delay line, having taps spaced to provide the sets of outputs in the different time delayed relationships, is preferably used to obtain the sets of outputs. The outputs in each set are coherently summed to provide the Doppler velocity indicative outputs. The output of maximum amplitude may be used to indicate the velocity of the target. The system may be implemented in a digital computer in accordance with known data processing techniques and it is a feature of the invention to provide signal processing by computer with much less computer overhead than needed to implement the bank of correlators or matched filters which are needed to obtain the Doppler velocity indicating output.

The foregoing and other objects, features and advantages of the invention will become more apparent from a reading of this description in connection with the accompanying drawings in which.

Figure 2:
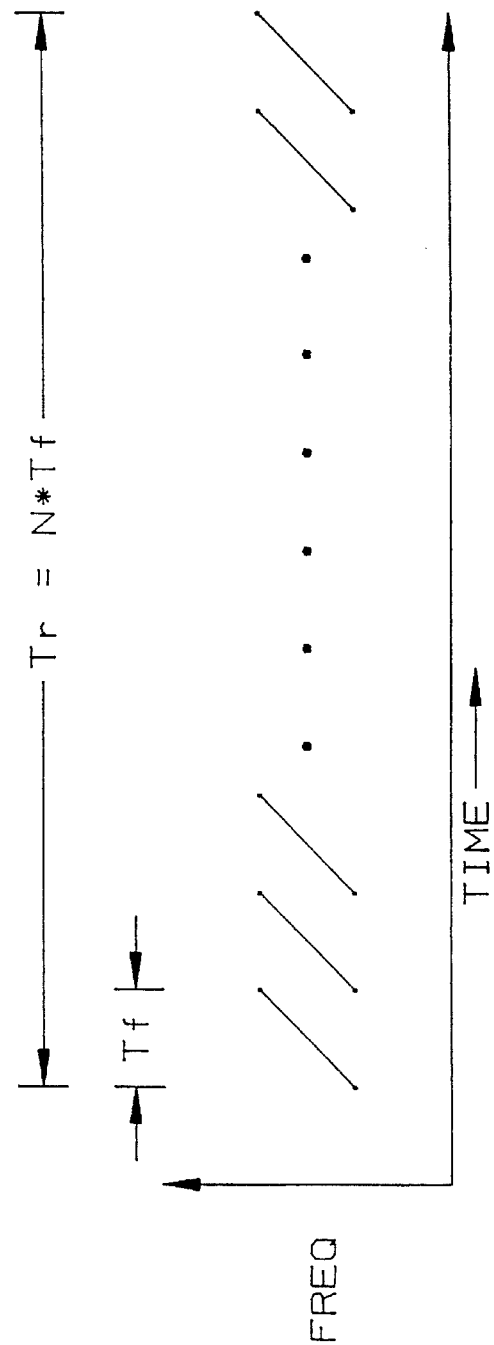
FIG. 2 is a plot of a wavetrain composed of the HFM sweeps shown in FIG. 1, repeated N times so as to provide a wavetrain (transmission) duration equal to $T_r$ which is N times $T_f$.
Figure 3:
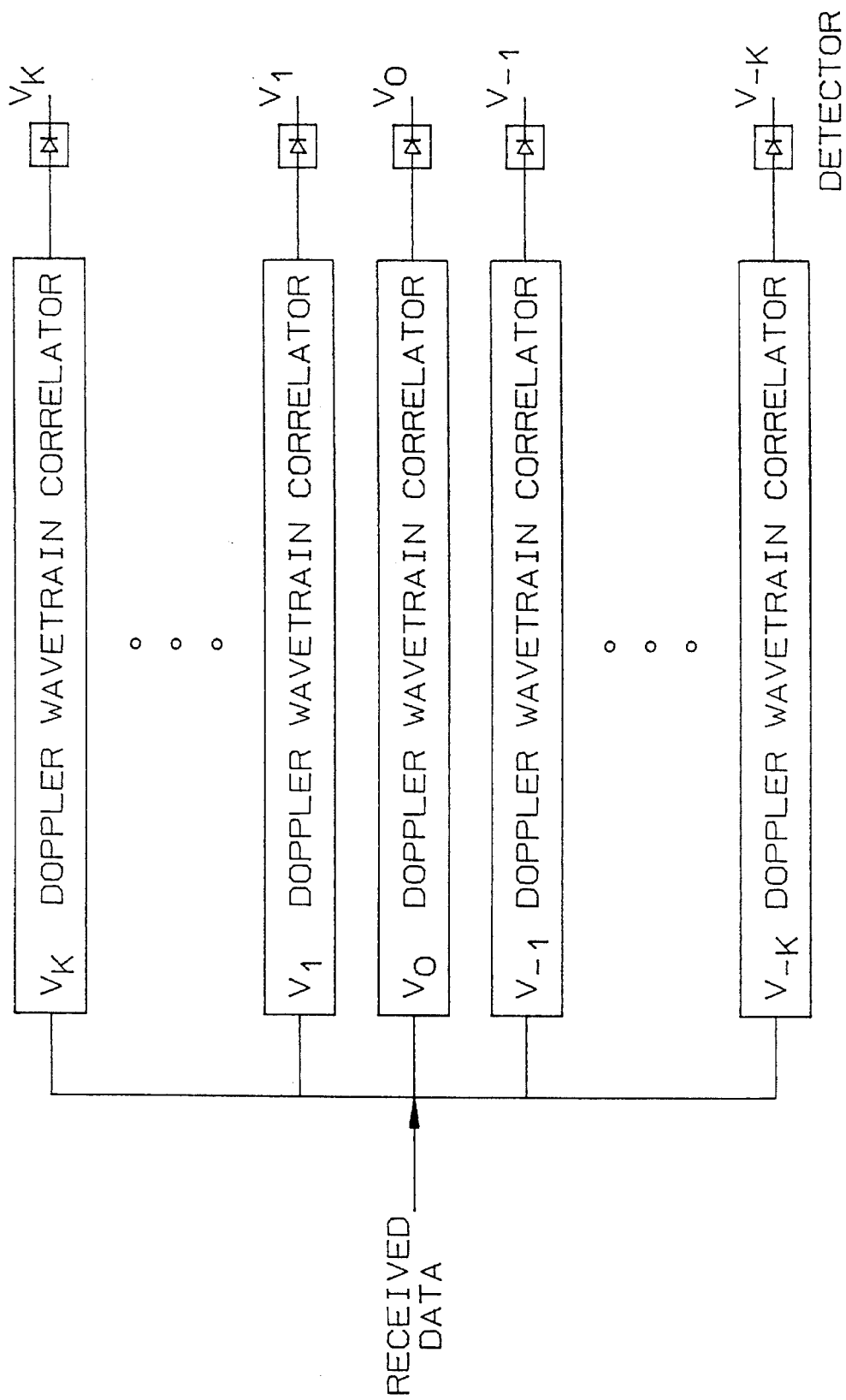

FIG. 3 is a schematic, block diagram of a process of the prior art having the bank of independent wavetrain correlators for each Doppler velocity where each correlator length equals the length (duration) of the wavetrain; and FIG. 4 is a schematic diagram of an exemplary signal processing system, for obtaining Doppler velocity outputs from a return in response to a wavetrain transmission such as shown in FIG. 2, and which is provided in accordance with the present invention.

Figure 1:
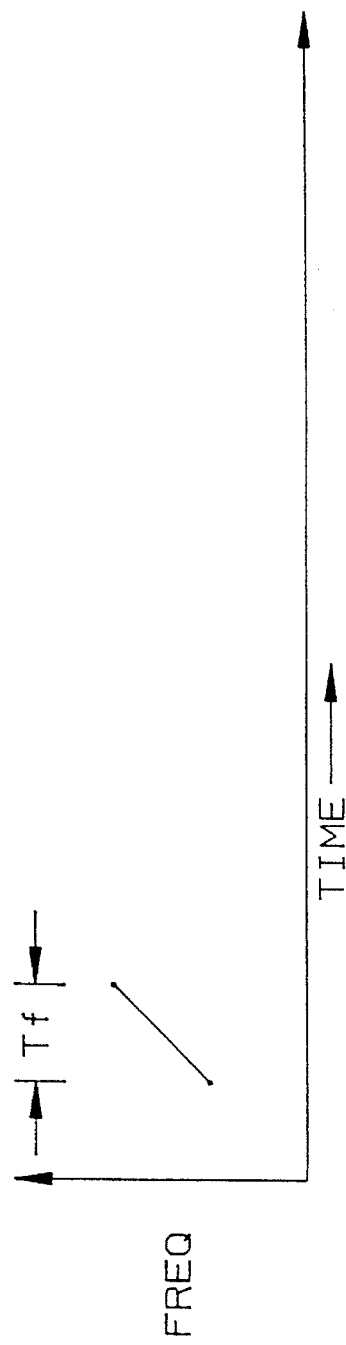
FIG. 1 is a plot of the fm sweep waveform of a single $H_{fm}$ sweep of time duration $T_f$.

While the transmission shown in FIG. 1 may be composed of an arbitrary number of phase continuous, Doppler invariant waveforms (N waveforms), in a practical system N may be from 10 to 20.

Referring to FIG. 4, the received data which may be the returns from the sonar or radar receiver, or digitized data corresponding to such returns, is applied to a zero Doppler waveform correlator 10 which utilizes a replica corresponding to any one of the Doppler invariant waveform. The output from the correlator is inputted to the head end of a tapped delay line 12. The delay line progressively delays the correlator output which is inputted to the delay line as a signal $S_0$. There are a plurality of sets of taps. The number of sets of taps depends upon the number of Doppler invariant waveforms in the wavetrain. There are N such taps. There is only one tap at the $S_0$ or input end of the line. There are taps for each Doppler velocity $V_k$ to $V_{-k}$ in groups at each of the other tap positions $S_1, S_2, \ldots S_{N-1}$. A group of such taps makes up a set which is applied to sets of cascaded coherent summers 14 (for $V_k$), 16 (for $V_1$), 18 (for $V_0$), 20 (for $V_{-1}$) and 22 (for $V_{-k}$). The sets of coherent summers for $V_2$ to $V_{k-1}$ and from $V_{-2}$ to $V_{-k-1}$ are not shown to simplify the illustration. The summers coherently (without any detection or non linear (e.g.) squaring) process) sum the outputs sets from the tapped delay line for their respective velocities. The output sum may be detected, as in a diode detector 24 for each of the Doppler velocity outputs. The detected outputs may be applied to a maximum amplitude detector not shown. The output of maximum amplitude will be indicative of the velocity of the target which produces the received data.

From the wavetrain shown in FIG. 2 as returned or reflected from a point target at zero Doppler velocity, the output from the correlator 10 is a string of N correlation peaks spaced $T_f$ seconds apart. Since the waveform is Doppler invariant, returns with a Doppler velocity will produce a similar string of N correlation peaks but spaced more or less than $T_f$ depending upon whether the return has respectively a negative or positive Doppler velocity. The taps on the tapped delay line are spaced corresponding to the compression (for approaching targets) or expansion (for departing targets) and the delay line is as long as the wavetrain plus the expansion (stretch) caused by the largest negative Doppler velocity to be processed. Where the wavetrain is $T_r$ seconds long and the largest negative Doppler velocity is $V_k$, delay line length is $(C_k*T_r)$ seconds where $C_k$ is a compression constant for the Doppler velocity $V_k$ in knots, and may be between 0.98 and 1.02.

Each Doppler velocity is formed by the coherent summer sets 14 through 22. In effect, the spacing of the summers is the duration of the compressed waveform for the Doppler velocity being processed by the set. To process for a zero Doppler velocity signal, the tap spacing is the transmitted waveform spacing $T_f$. Since the zero Doppler return has zero compression. The tap at $S_1$ is spaced from the preceding tap by one times $T_f$ seconds. The final tap at $S_{n-1}$ is spaced by N-1 times $T_f$ seconds.

The sets which coherently sum the signal with Doppler are adjusted in spacing in accordance with the Doppler velocity. For a Doppler velocity $V_j$, where j varies from one to k and from -1 to -k, the spacing is $T_f* (C_j)$ seconds.

Generally for any velocity, the output of any set $(V_j(t))$ as a function of time is expressed by the following equation:

$$V_j(t) = \sum_{i=0}^{N-1} S[t + i*(T_f*C_j)]$$

where:

t is time, i=0 is the first and i=N-1 is the last of the N Doppler invariant signals, S(t) is said output signal at time t, $T_f$ is the duration of each of said Doppler invariant signals, $C_j$ is a compression constant for the Doppler velocity $V_j$, and

* represents multiplication.

The wavetrain may have different Doppler invariant signals than shown in FIG. 2. For each additional waveform in a wavetrain, a zero Doppler correlator and a separate delay line is utilized for each unique waveform. The tap outputs from all the delay lines are then coherently summed to produce a single output for each Doppler velocity of interest. Thus, for "V" or rooftop signals two correlators are required and two separate sets of cascaded coherent summers for each velocity of interest, as pointed out above.

From the foregoing description it will be apparent that there has been provided an improved signal processing system utilizing delay lines and summers, or their equivalent in a programmed computer, and which is adapted to process a transmission containing a sequence of waveforms. Variations and modifications in the herein described system, within the scope of the invention, will undoubtedly suggest themselves to those skilled in the art. Accordingly the foregoing description should be taken as illustrative and not in a limiting sense.

I claim:

1. A method for detection of the velocity of a target from return signals returned from the target in response to a transmission containing a plurality of successively occurring Doppler invariant signals, said method comprising the steps of correlating said return signal with a replica of one of said Doppler invariant signals to obtain first output signals corresponding to the correlation of said return signals with said replica, progressively delaying said first output signals to provide a plurality of sets of said first output signals occurring in different time delay relationship, each relationship corresponding to a different velocity of said target, and coherently summing said first output signals in each set to provide a plurality of third outputs indicative of the velocity of said target.

2. The method according to claim 1 wherein said delaying step is carried out to provide a plurality of said first output signals in each of said sets which occur at intervals which increase in duration.

3. The method according to claim 2 wherein said coherent summing step is carried out to sum each of said output signals with sums of preceding ones of said output signals.

4. The method according to claim 1 wherein said Doppler invariant signals are generally identical in waveform.

5. The method according to claim 1 wherein said plurality of Doppler invariant signals are generally identical in frequency range and duration and wherein said delaying and summing steps are carried out to provide for each velocity $V_j$ where V is the velocity, where j is the number of said third outputs said third outputs $V_j(t)$ corresponding to a different target Doppler velocity $V_k$ in accordance with the following equation:

$$V_j(t) = \sum_{i=0}^{i=N-1} S[t + i*(T_f*(C_j))]$$

where t is time, i=0 is the first and i=N−1 is the last of said N Doppler invariant signals, S(t) is said output signal at time t, $T_f$ is the duration of each of said Doppler invariant signals, $C_j$ is a compression constant for the Doppler velocity $V_j$, and

* represents multiplication.

6. The method according to claim 5 wherein said N Doppler invariant signals constitute a waveform of duration $T_r$ in seconds, and said delaying step is carried out with a delay line which provides a delay of $(C_k * T_r)$ where $C_k$ is the compression factor for the largest negative Doppler velocity $V_{-k}$.

7. The method according to claim 6 wherein said delay line has taps which provide said second output signals for each said sets spaced in time by times $i*(T_f*C_j)$ to provide said time delay relationship of said second output in each of said sets.

* * * * *